UNITED STATES PATENT OFFICE.

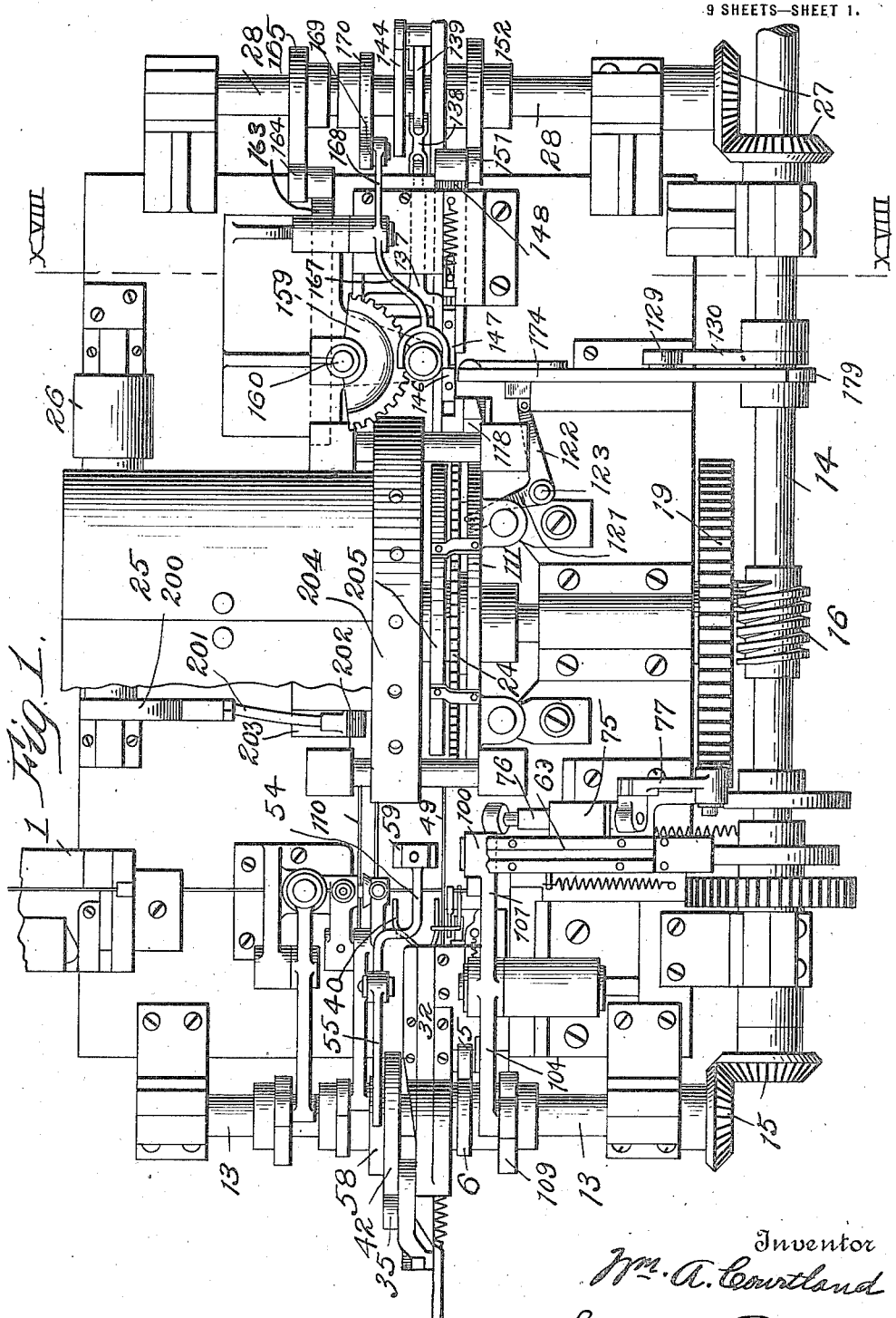

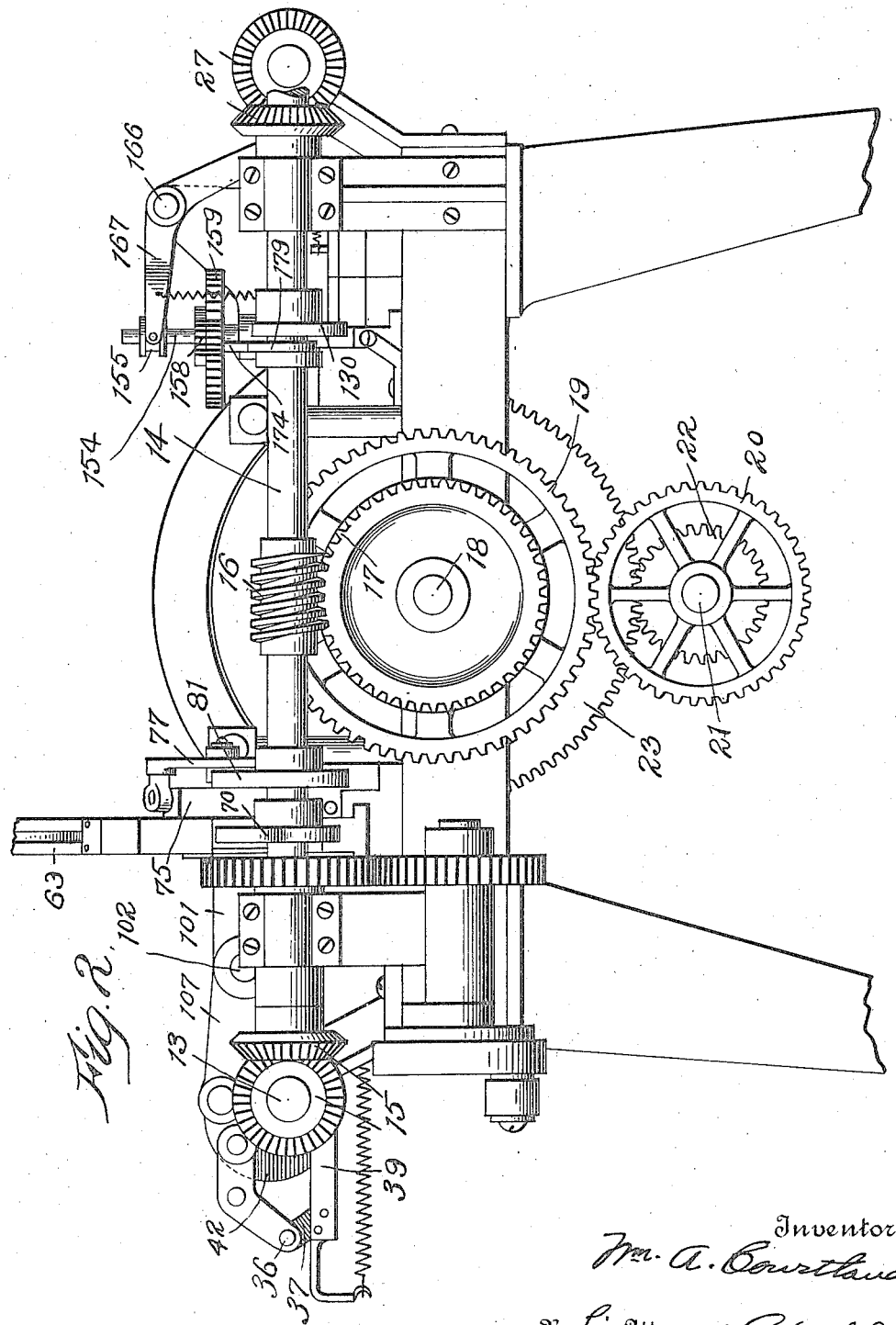

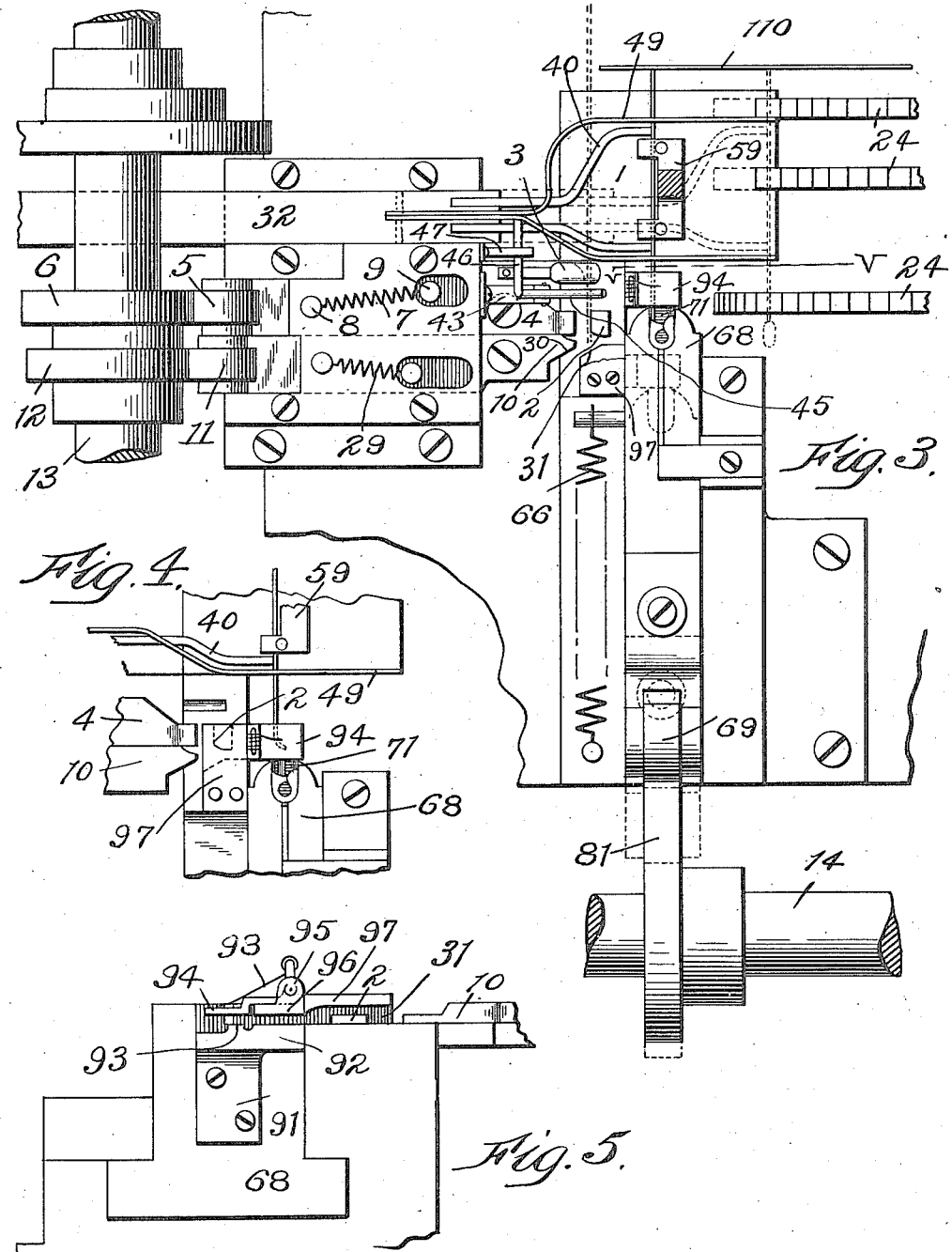

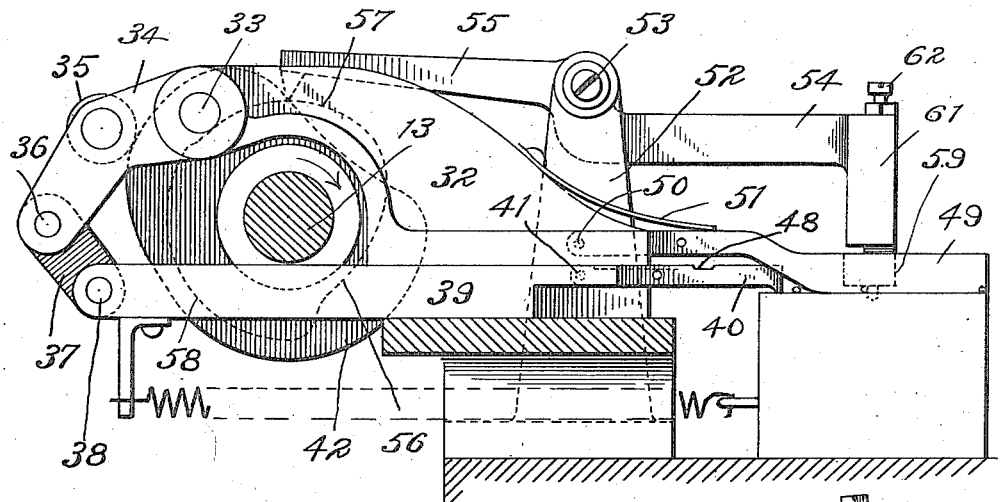

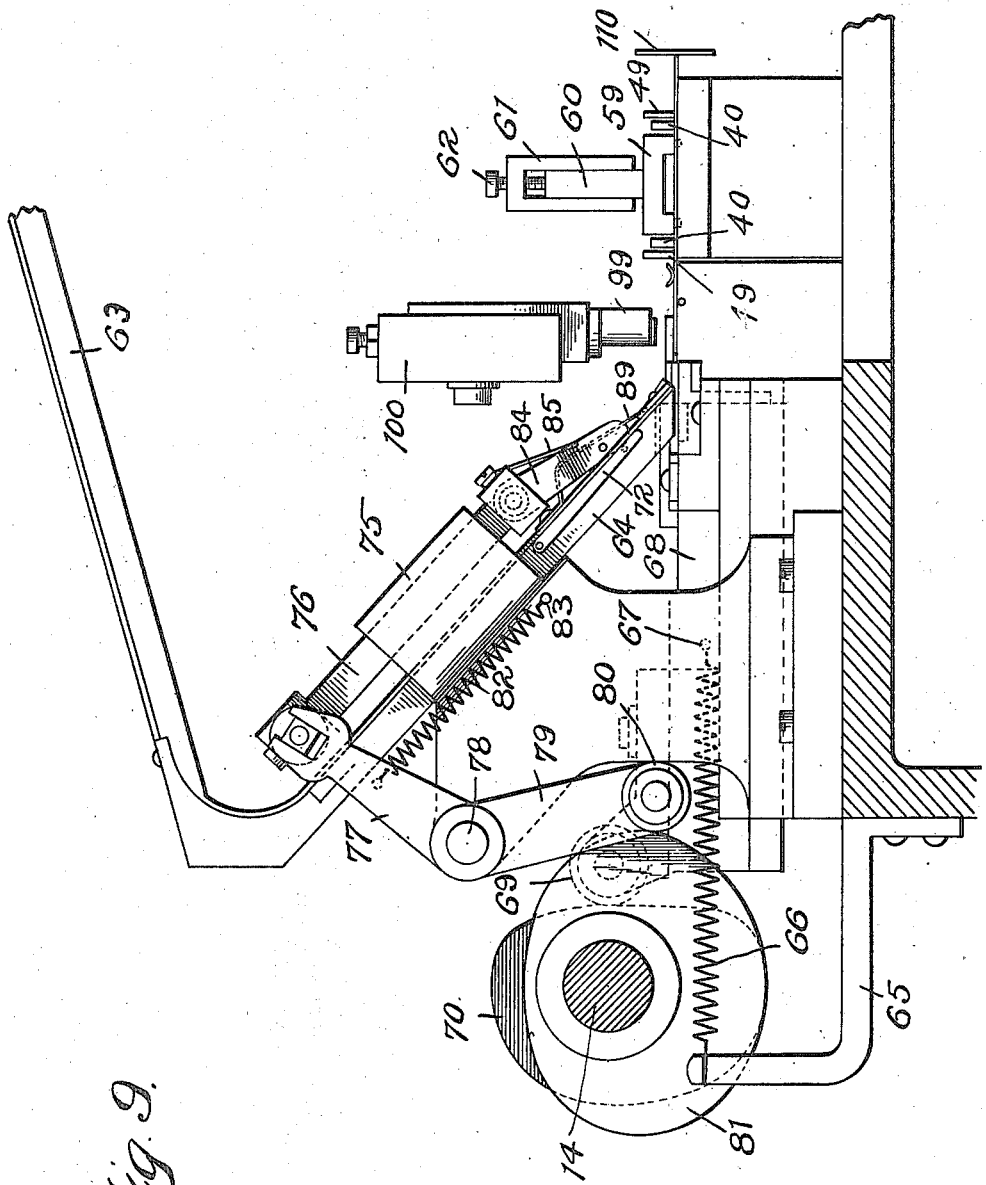

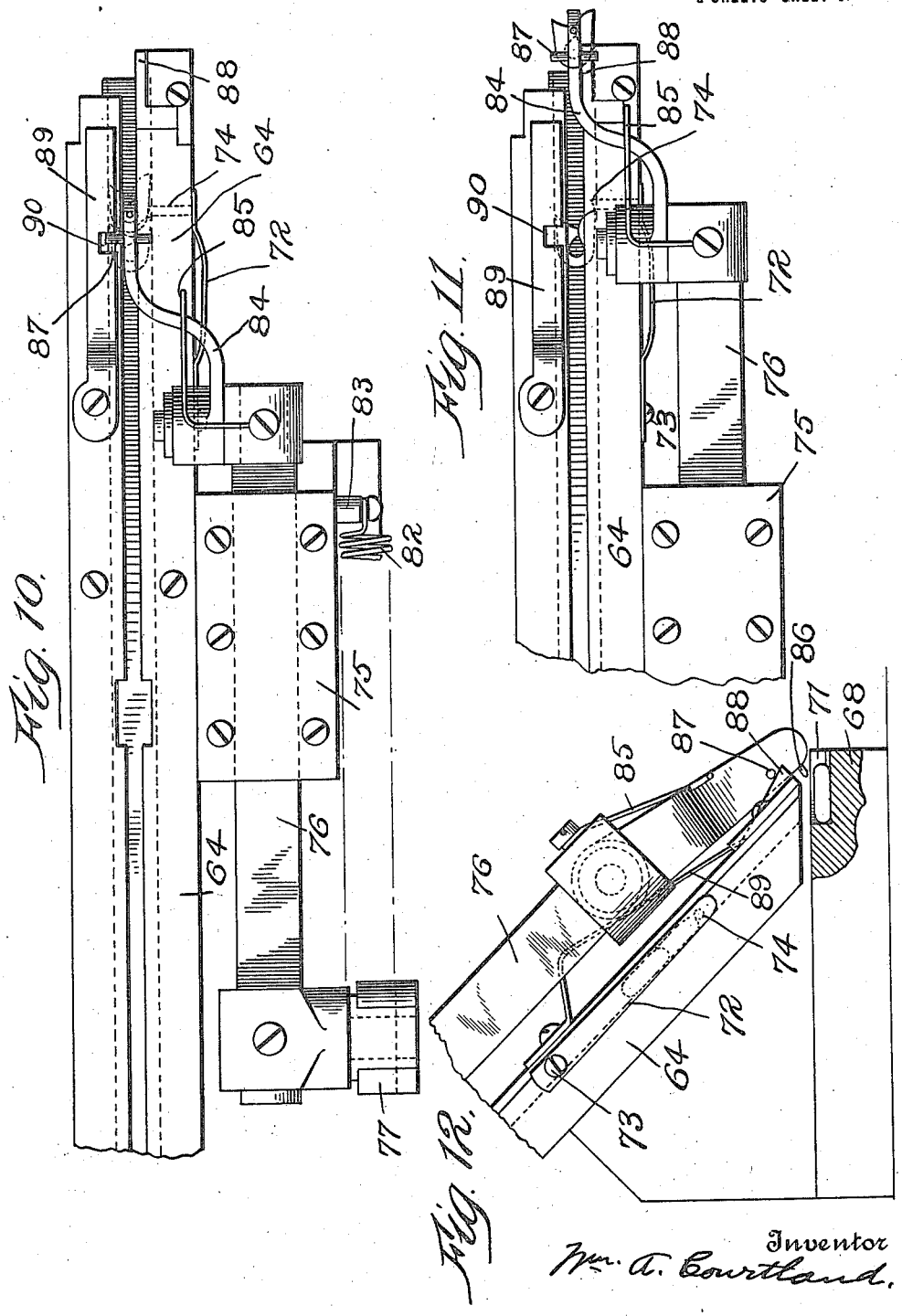

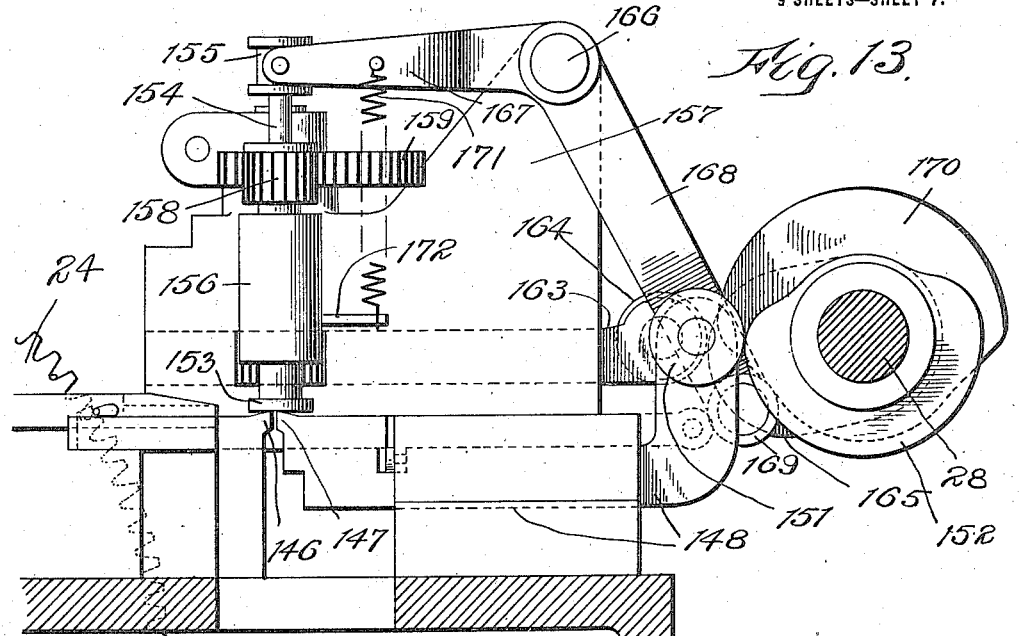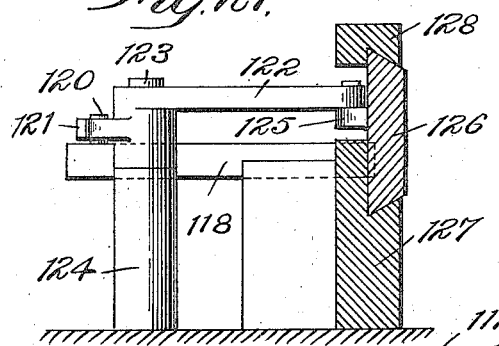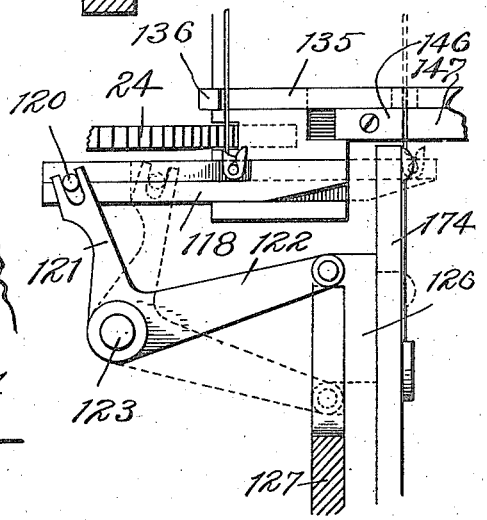

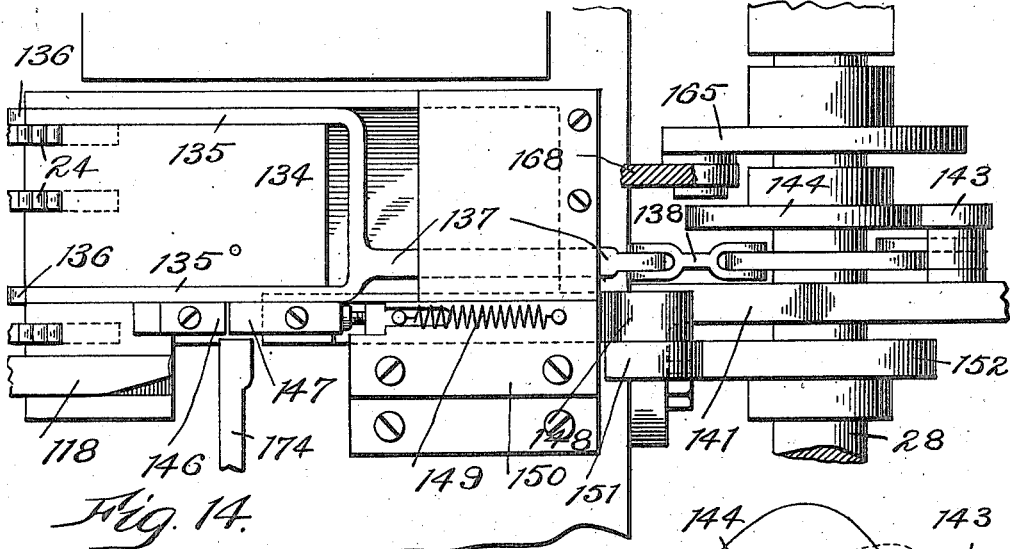
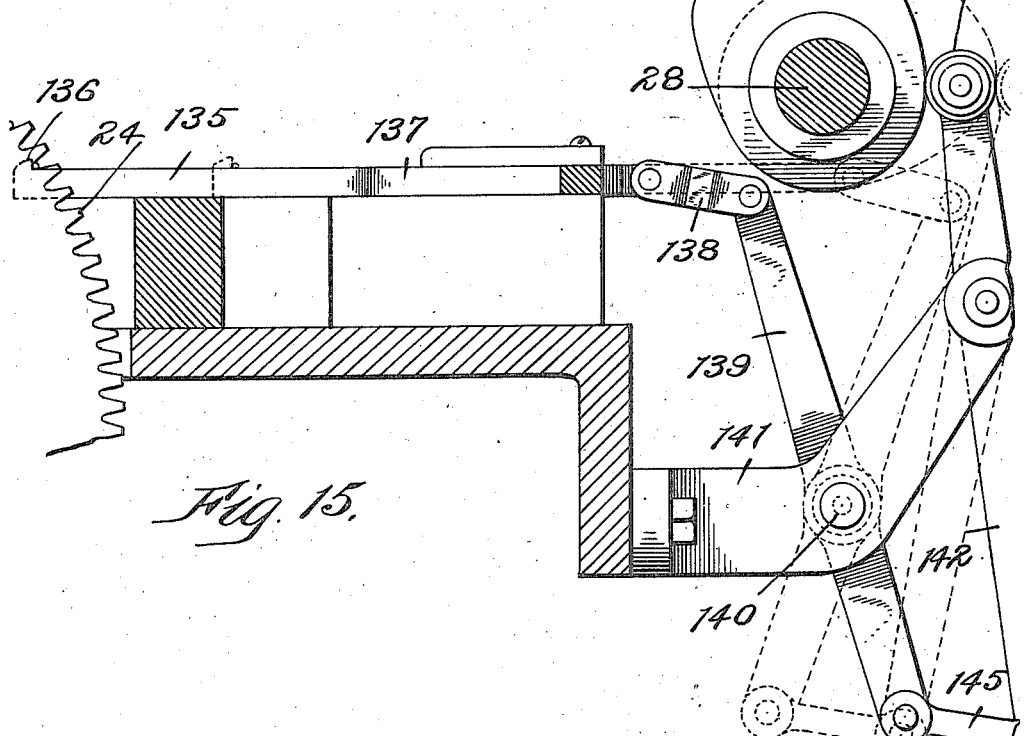

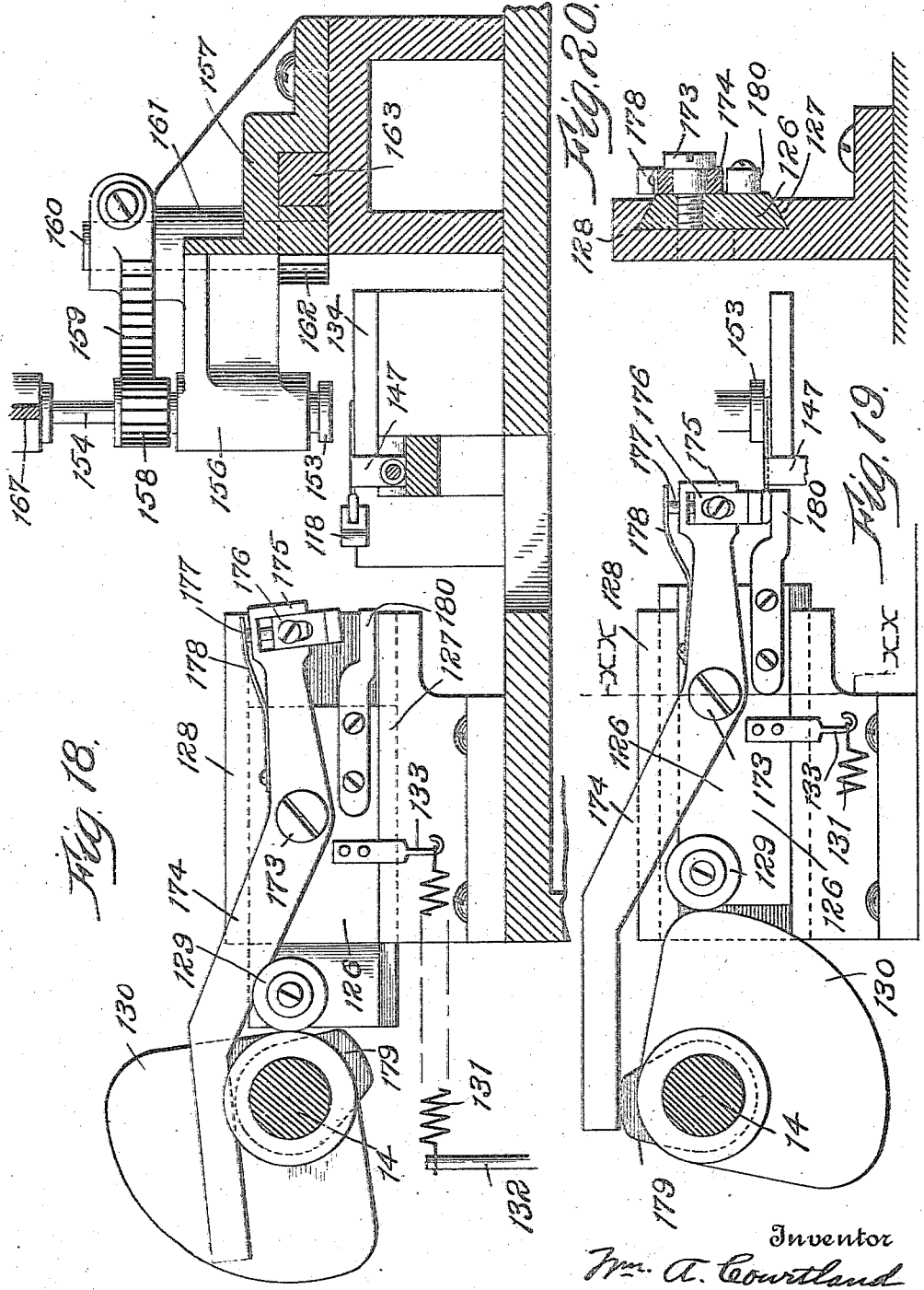

WILLIAM A. COURTLAND, OF BROOKLYN, NEW YORK, ASSIGNOR TO AMERICAN PIN COMPANY, OF WATERBURY, CONNECTICUT, A CORPORATION OF CONNECTICUT.

SAFETY-PIN MACHINE.

1,228,651.  Specification of Letters Patent.  Patented June 5, 1917.

Application filed May 27, 1915. Serial No. 30,762.

*To all whom it may concern:*

Be it known that I, WILLIAM A. COURTLAND, a citizen of the United States, and residing in the borough of Brooklyn, county of Kings, and State of New York, have invented certain new and useful Improvements in Safety-Pin Machines, of which the following is a full and clear specification.

This invention relates to safety pin machines and has for its primary object to provide an improved construction, combination and arrangement of parts in a machine of this character with a view to increasing its capacity and efficiency while at the same time materially reducing the amount of power required to operate the machine. One of the contributory objects of the invention for effecting this result is to relieve the congestion of parts, which is commonly found around the winding mechanism in machines of this character. One object of the present invention is to provide improved means of simplified construction for necking a safety pin blank and in combination therewith means for capping said blank before delivering it to the sharpening mechanism. By this means the pin blank is provided with the smooth rounded surface of the cap for a bearing surface during its combined rotary and sliding movement across the abutment plate during the progress of the sharpening operation. Furthermore, by applying the cap to the blank before sharpening said blank, the operation of arranging the blanks in the same predetermined order is facilitated. Another object is to provide improved means for presenting the capped blank to the winding mechanism. A further object is to provide improved means for positively picking the blank or completed safety pin from the clamp or gripping means which hold it during the winding operation so that it will be impossible for blanks or pins to accumulate around the winding mechanism when the machine is operated at high speed. Other and further objects of invention will appear in the specification and be pointed out in the appended claims, reference being had to the accompanying drawings which show the preferred embodiment of my invention and in which:—

Figure 1 is a plan view of the preferred embodiment of my invention, parts being broken away;

Fig. 2 is a side elevation of the same;

Fig. 3 is a fragmentary top plan view of the machine showing the necking and capping mechanisms on an enlarged scale, parts being omitted, parts broken away and parts shown in section;

Fig. 4 is a fragmentary plan view showing parts of Fig. 3 in other positions;

Fig. 5 is a fragmentary section on the line V—V Fig. 3;

Fig. 6 is a side elevation of some of the parts shown in Fig. 3;

Fig. 7 is a side elevation of the cap-securing means, parts being shown in section;

Fig. 8 is a side elevation on an enlarged scale of the means for releasing the pin blanks from the necking mechanism;

Fig. 9 is a front elevation of the cap-feeding and cap-securing mechanisms, parts being shown in section;

Fig. 10 is a top plan view of the cap-feeding chute;

Fig. 11 is a fragmentary view of the same on an enlarged scale;

Fig. 12 is an elevation of the parts shown in Fig. 11;

Fig. 13 is a side elevation of the blank-winding mechanism, showing the blank-folding vise and means for moving separated blanks into said vise, parts being shown in section;

Fig. 14 is a plan view of the blank-clamp and means for feeding blanks thereto;

Fig. 15 is a side elevation of the parts shown in Fig. 14, parts being shown in section;

Fig. 16 is a plan view of the mechanism for arranging the capped blanks as they are fed up to the winding mechanism;

Fig. 17 is an inside elevation of the guides for arranging the capped blanks;

Fig. 18 is a transverse section on an enlarged scale of the machine corresponding to line XVIII—XVIII, Fig. 1, parts being omitted;

Fig. 19 is a fragmentary view of the same showing the parts in other positions;

Fig. 20 is a section on line XX—XX, Fig. 19;

Fig. 21 is a combined section and elevation of parts shown in Fig. 16.

According to the preferred embodiment of my invention shown on the drawings, the wire strand passes through a straightening device 1 (see Fig. 1) of well known construction until the end thereof projects a short distance beyond a fixed die or anvil block 2 (see Fig. 3). A resilient presser foot 3 is suitably disposed to keep the wire flat. A movable jaw 4 is constituted by the end of a slide which carries a roller 5 running on a cam 6. A spring 7 connected at one end to a fixed post 8 and at its other end to a post 9 carried by the slide, serves to keep the roller 5 against cam 6. After jaw 4 has clamped the wire to the anvil 2, a blank is cut therefrom in the usual manner while a movable die 10 constituted by the end of a slide which carries roller 11, crooks the end of said blank to form a neck thereon. For this purpose, a cam 12 is provided for operating roller 11. Cams 6 and 12 are carried by a cam shaft 13 which as shown in Fig. 1 derives its power from the main drive shaft 14 by means of beveled gears 15. As shown in Figs. 1 and 2, the drive shaft 14 has keyed thereto a worm gear 16 which meshes with a gear 17 on the shaft 18. A gear 19 also keyed to the shaft 18, meshes with a gear 20 keyed to shaft 21. A pinion 22 which is also keyed to shaft 21, meshes with a gear 23 which drives the conveyer wheels 24 which carry the capped pin blanks during the sharpening operation. The sharpening mechanism is of common well known construction. In the sharpening mechanism, a pulley 26 is keyed to a shaft which carries an eccentric operating within an eccentric strap 200. A rod 201 transmits power from the eccentric strap 200 to a reciprocatory sharpening element 202, this sharpening element in the present embodiment being somewhat like a file on its upper surface and slidably supported on the guide surface. The sharpening mechanism comprises a plurality of these reciprocable sharpening elements (only one being shown) within the housing 25. As these file-like sharpening elements are rapidly reciprocated, the point ends of the pin blanks are passed into engagement with the successive sharpening elements, being at the same time rotated in their sockets in the conveyer wheels 24 in the manner to be hereinafter pointed out. The drive shaft 14 is also connected by bevel gears 27 with a cross shaft 28 which operates the winding mechanism in the manner to be hereinafter pointed out. A spring 29 serves to hold the roller 11 against cam 12. It will be noted on Fig. 3 that the die 10 is provided with an inclined face 30 which wedges against a corresponding surface on a guide block 31 to prevent lateral displacement of the die 10 during the necking operation. Referring now to Figs. 3 and 6, a bracket 32 carries at its outer end a pin 33 upon which is swingingly mounted a bent cam lever 34 which carries a cam roller 35. Lever 34 is pivotally connected at 36 to one end of a link 37, the other end of said link being connected at 38 to one end of a slide 39. A pair of push fingers 40 are pivotally connected at 41 to the forward end of said slide and whenever said slide moves forward it carries a safety pin blank first into position to have a cap affixed to the necked end and then to the conveyer wheels 24. For this purpose the cam 42 which moves the cam roller 35, is provided with a concentric portion which is intermediate to the inner and outer runs of said cam, the slide 39 being therefore allowed to rest for a period of time during which the cap is applied. Suitable and efficient means for lifting a pin blank over the fixed die or anvil, may be provided by the device shown in Figs. 3 and 8. Thus, secured to a rigid portion of the machine is a bracket 43 within which is pivoted at 44, a lever arm 45 having a rearwardly extending offset 46 which is subject to the pressure of a leaf spring 47 carried on the rigid support which carries bracket 43. Spring 47 causes said offset to engage one of said push fingers 40 which is provided with a notch or recess 48 into which said offset drops after the forward movement of the push fingers commences. In consequence the parts assume dotted line position shown in Fig. 8, thus elevating the necked end of the blank sufficiently to free it from the anvil. A normal pressure tending to hold the blanks flat upon the table over which they are fed is exerted by the flat bars 49 which are pivoted at 50 in the bracket 32 and pressed upon by a leaf spring 51. As cam roller 35 travels over the concentric portion 42 of its cam, the pin blank is in the position shown in Figs. 3 and 4. In order to hold the pin in this position, the following means are employed: Referring to Figs. 6 and 9, a standard 52 serves to mount a lever on the pin 53, said lever comprising a clamp arm 54 and a cam arm 55 which is oscillated by a cam provided with an inner run 56, an intermediate run 57, and an outer run 58. As the cam rotates in the direction of the arrow in Fig. 6, the clamp jaw first moves down adjacent to the pin blank and then as the outer run 58 comes into play the clamp jaw is forced home and positively clamps the blank. As shown in Fig. 9, the clamping jaw comprises branches 59 provided with a tongue 60 slidably mounted in a yoke 61 and adjustably positioned by a screw 62. That portion of the cap chute shown on the drawings comprises an upper section 63 and a lower section 64 which is shown best in Figs. 10, 11, and 12. In Fig. 9, is shown a bracket arm 65 to which one end of a spring 66 is attached, the other end of said spring being connected to a pin 67 on a slide 68 which carries a cam roller 69. Cam roller 69 runs on a cam 70, having inner, intermediate, and outer runs. As shown best in Fig. 12, the slide 68 is provided with a cap holding recess 71 at its inner end into which the caps are separately discharged at times when roller 69 is in engagement with the innermost run of cam 70. Adjacent the lower end of the section 64 of the chute, a leaf spring 72 which is held by a screw 73, carries a spur 74 which projects through the side wall of the chute. The inner end of said spur is beveled and projects from the inner wall sufficiently to yieldably retain the caps in the chute. Section 64 of the chute carries a laterally projecting guide 75 within which reciprocates a slide 76 suitably connected to a lever arm 77 which is oscillated on its axis 78 by means of a cam arm 79 which carries a cam roller 80 operated by the cam 81. A spring 82 connected at one end to lever arm 77 and at its other end to a fixed pin 83 presses the roller 80 against cam 81. A feed finger 84 which is pivotally connected to the lower end of slide 76 is pressed upon by a spring 85 and carries at its lower end a spur 86 which is adapted to engage the lowest cap in the chute and to force it over the yieldable spur 74. A transverse pin 87 projects on opposite sides of the lower end of feed finger 84. Near the end of the downward movement of slide 76 the pin 87 on one side rides over a wedge 88 and elevates the spur 86 sufficiently to release the cap into recess 71 in slide 68. On the return stroke of said feed finger, the oppositely projecting end of pin 87 rides over a strip 89 until it reaches a recess 90 which permits the finger to drop, thus causing spur 86 to engage the next lower cap in the chute. By an inspection of Figs. 4 and 5, it will be noted that slide 68 carries a bracket 91 with an overhanging portion 92 having its upper face comprising a table 93 for holding the crooked end of the blank horizontal under the pressure of a yieldably mounted leaf 94 which is pivoted at 95 on an overhanging portion 96 of a plate 97 carried by the forward end of slide 68. A spring 98 imparts yieldable pressure to the leaf 94. This construction serves to hold the pin blank in capping position while the outermost run of the cam 70 imparts the final inward movement to the slide 68 which forces the cap carried thereby onto the neck of the blank, the yieldable shutter 96 being moved along the shank of the blank until the parts occupy the positions shown in Fig. 3. The cap is now ready to be permanently clamped to the pin blank. For this purpose a stamping die 99 (see Fig. 7) is suitably mounted in the stamping head 100 carried by one arm 101 of a lever oscillatably mounted on a stub shaft 102 carried by a bracket 103. A spring 104 which encircles the hub of this lever has one end resting against a pin 105 projecting from bracket 103 and the other end pressing against a pin 106 which projects from the cam arm 107 of said lever. A cam roller 108 runs over a cam 109 on the cam shaft 13. This cam operated mechanism is suitably timed to effect the cap-stamping movement for the successive pin blanks as they have their caps applied thereto, a guide plate 110 being provided to aline the ends of said pin blanks as they are moved to and from capping position. The movement of the cam roller 35 (see Fig. 6) over the innermost run of the cam 42, now serves to move the pin blank to the conveyer wheels 24 which carry it through the sharpening mechanism hereinbefore referred to. The wheels 24 are provided with blank-carrying peripheral notches, the blanks being automatically deposited in said notches by the push fingers 40. As said blanks are raised from the feed table, they are brought into engagement with the pressure arch 204 and retaining arch 205 in such a way as to rotate the pin blanks as their points successively pass over the cutters 202 of the series of sharpening elements hereinbefore referred to. It will be understood therefore that each blank, while it is being sharpened, is caused to rotate by the frictional engagement of the shank of the pin with arches 204 and 205. For this purpose, the conveyer wheels are provided with peripheral transverse grooves or sockets within which the general blank shanks rotate under the pressure of said arches 204 and 205. As the pin blank is being sharpened, the broad round surface of the cap slidably and rotatably engages the guide plate 111. After passing through the sharpening mechanism with their combined translating and rotary movements, the blanks successively pass through the different positions indicated in Fig. 17, the cap of each pin being caused by its rotary movement in the direction indicated by the arrow to finally assume a forwardly presented arrangement in which it slidably engages oppositely arranged guide bars. As shown in Fig. 17, a guide bar 112 is pivotally mounted on a pin 113 which projects from the inner face of guide plate 111, being normally pressed against a stop pin 114 by means of a leaf spring 115. Another guide 116 of shorter length is spaced from the guide bar 112 and swings about a pin 117, the larger portion of its length serving to normally retain it in the position shown in Fig. 17. As the pin blanks continue to rotate and advance, the caps eventually strike the overhanging portion of guide 112 and inasmuch as the caps are revolving about the pin blanks in a clockwise direction according to Fig. 17, any further revolving movement is prevented so that thereafter said caps are presented forwardly and slide along the guides until they reach the table 134. It will be seen from this description that the rear ends of the guide bars 112 and 116 are adapted to yield slightly whenever the cap on a blank strikes either of them, thus facilitating the entrance of the caps between said guide bars. As the capped pin blank is moved out of the notches in the conveyer wheels 24, by means presently to be described, the forwardly presented cap passes into a groove 119 formed in the lateral wall of a slide 118 (see Figs. 14, 16, 17 and 18). The rear portion of the top wall of said groove is removed so as to permit the slide to be reciprocated from the position shown in Fig. 17 into the position shown in dotted lines in Fig. 16. Referring to Figs. 16 and 21, a pin 120 which projects upwardly from the slide 118, is engaged by the forked end of a lever arm 121 which is offset from but rigid with another arm 122, said arms being provided with a common hub journaled on a pin 123 carried by a fixed post 124. The outer end of arm 122 is pivotally connected to a lug 125 on a slide 126 which reciprocates in the guides 127 and 128. As shown in Figs. 18 and 19, slide 126 carries a roller 129 which runs over a cam 130, thus imparting a reciprocatory movement to slide 126. A spring 131 having one end secured to a fixed rod 132 and its other end secured to a hook 133 on the slide 126, presses the roller 129 against cam 130. As the cap of a blank enters the groove 119 in the slide 118, the shank of said blank reaches the table 134. As shown best in Fig. 14, the table 134 is provided with grooves within which reciprocate a pair of parallelly arranged draw bars 135 provided with hooked ends 136. These draw bars 135 are united to a common bar 137. A link 138 connects the end of bar 137 to the upper end of a lever 139 which is pivoted on an axis 140 in the elbow of a bent arm bracket 141 (see Figs. 14 and 15). On the outer end of said bracket 141 is journaled a cam lever 142 carrying at its upper end a roller 143 which runs over a cam 144 keyed to shaft 28. A link 145 connects the lower ends of levers 139 and 142 so that a double multiplication of the movement imparted to cam roller 143, is transmitted to draw bars 135. A spring (not shown) serves to keep the roller in running engagement with cam 144. The action of cam 144 is suitably timed to operate levers 142 and 139 and through them the draw bars 135 to periodically present a capped pin blank to the winding head 153 to be presently referred to. During this movement the cap on the pin blank is disposed within the slot 119 in slide 118 and inasmuch as said slide is moved forwardly at the same time in the manner indicated, the forward movement of the pin blank is facilitated and is terminated only after said pin blank has dropped into the space between a fixed jaw 146 and a movable jaw 147, said fixed jaw 146 being provided with an upwardly inclined top face so that each pin blank as it moves forward rides thereover. The movable jaw 147 is mounted on a slide 148 (see Figs. 13 and 14) to which is attached one end of a spring 149 which tends to hold said movable jaw away from the fixed jaw. The other end of said spring 149 is secured to the guide block 150 within which the slide 148 reciprocates. On an upwardly projecting portion of the slide 148, is journaled a roller 151 which travels over a cam 152 on shaft 28, said cam being suitably arranged to time the movement of the movable jaw 147 to successively clamp the pin blanks in suitable position to be operated upon by the winding mechanism which is shown in Figs. 1, 13 and 18. The details of construction of said winding head have not been shown since they do not constitute in their specific nature, a part of the present invention. For convenience of expression, I have employed the term "fixed station winding mechanism" to distinguish a winding mechanism in which the winding head rotates about a fixed axis from the winding mechanism in which the winding head is translated from one point to another during the time that it is rotating to wind the capped pin blank. For the purpose of this description therefore, it is sufficient to state that the winding head 153 partakes of the up and down movements of the spindle 154 which as shown in Fig. 13 carries a spool 155 at its upper end and is journaled in the bearing 156, said fixed bearing being carried by a bracket 157. A spur pinion 158 is splined to the spindle 154 and meshes with a segmental gear 159 which is keyed to the upper end of a shaft 160. Said shaft 160 is journaled in a bearing 161 carried by bracket 157 and has keyed to its lower end a spur gear 162 which meshes with a rack bar 163 which is reciprocably mounted in the bracket 157 and carries a cam roller 164 driven by a cam 165 which is keyed to the shaft 28. As shown best in Figs. 1 and 13, a stub-shaft 166 mounted in an upwardly extending portion of the bracket 157, oscillatably supports a bent lever comprising an arm 167 which is movably connected to the spool 155 and a cam arm 168 which carries a roller 169 which travels over a cam 170 on the shaft 28. A spring 171 having its upper end secured to the arm 167 and its lower arm attached to a fixed rod 172, retains the roller 169 in running contact with the cam 170. It is to be noted that the winding head rotates on a fixed axis, the pin blanks being conveyed to it, and the finished pins conveyed away from it. Means for conveying the pin blanks to the winding head have already been described. In Figs. 18, 19 and 20, the slide 126 carries a laterally projecting stud 173 which oscillatably mounts a bent lever 174. One end of said lever is provided with a guide yoke 175 within which is reciprocably mounted a movable picker jaw 176 provided with a pin 177 which projects upwardly and is yieldably pressed by a spring 178. The other end of the lever 174 is arranged to be engaged by a cam 179 on the shaft 14. A fixed picker jaw 180 is arranged in the plane of movement of said movable picker jaw, being secured by means of an extension to the lateral face of the slide 126. It will be understood from this description that as the cam 130 moves the slide 126 inwardly, the movable jaw 176 is permitted to move away from the fixed picker jaw 180 which is rigidly secured to the slide 126. As said slide pauses at the inner end of its movement, movable picker jaw 176 coöperates with fixed picker jaw 180 to grip the completed safety pin or any imperfect result of the process which is under the winding head and removes it before the next blank gets there. An inspection of Figs. 16, 18 and 19 will show that the movement of slide 126 away from the winding head 153, withdraws the picker jaws 175 and 180 which grip the completed safety pin under the action of cam 179 on lever 174, the clamping jaws 146 and 147 having been released just prior to this movement. During the same time, the forward movement of draw bars 135 and slotted slide 118 move another capped blank to the clamping jaws 146 and 147 to be wound by the winding head 153.

The operation of my improved safety pin machine will now be readily understood and briefly described is as follows:—Wire is fed through the straightening mechanism 1 until the free end thereof overlaps the anvil block 2 between which and the clamping jaw 4 it is held while a blank of the required length is severed from the stock wire. The movement of the neck forming die 10 toward the anvil block 2 forms the neck. After the neck blank has been made to hurdle the fixed anvil block 2 in the manner already described, the pusher fingers 40 move the blank into position beneath the clamping foot 59 which descends and clamps the blank in position to have the cap applied thereto in the manner shown in Fig. 4. Immediately a cap which has been conveyed from the cap chute 64 by the female capping die, is forced on to the neck of the blank and the male die 99 caused to descend and rivet the cap in position on the necked end of the blank. At this stage of the process the clamping foot retains its hold on the blank and the pusher fingers remain in inactive position until the female cap-carrying die 71 retreats to its rearmost position. Said clamping foot is then lifted and the pusher fingers continue their forward movement to transfer the capped blank to the conveyer wheels 24. During the cap-applying operation just described, another portion of the stock wire has been fed into the machine. When the pusher fingers 40 begin their retreat to initial position for bringing up the next safety pin blank, the clamping and necking dies seize and neck the succeeding blank while at the same time the cap-carrying die moves into the position shown in Fig. 12 to receive a cap which is released from the cap chute by the special feed mechanism hereinbefore referred to. On their backward movement, said pusher fingers ride over the blank which is in process of being necked. As said pusher fingers start forward they serve to operate the blank-lifting device 45 which causes the blank to hurdle the anvil block and said blank is moved to capping position. Each blank as it enters the grinding zone, is caused to rotate on its axis by its engagement with the arches 204 and 205, while its cap has a combined sliding and rotating contact with the abutment plate 111. As each blank approaches the winding mechanism, the device shown in Fig. 17 arranges the said blank to present the cap forwardly. The draw bars 135 now engage the blank and begin their movement from the conveyer wheels toward the winding mechanism. At this moment the picker jaws 176 and 180 are about to close upon the preceding blank which has now assumed the form of a completed safety pin. Said winding head is just about to move upwardly and the winding segment about to turn the head backward to initial position. Preferably the next blank is now moved a short distance beyond the fixed jaw 146, the draw bars remaining in their forward position until the movable jaw 147 has about completed its clamping movement. The retreating movement of the draw bars is made sufficiently rapid to pass under the next blank in the conveyer wheel, thus making it unnecessary to provide movable portions on said bars. As soon as the blank is firmly secured in the clamping jaws 146, 147, the picker jaws 176, 180, move inwardly until they reach a point just short of the path of the pointed end of the pin on the winding movement. Here they remain until the winding movement is completed after which they move to their innermost position to secure the pin just prior to its release from the clamping jaws 146, 147, a movement which is preceded by the upward movement of the winding head. As soon as the clamping jaws 146, 147, let go, the picker jaws 176, 180, retreat to carry the completed pin away from the winding mechanism and this movement causes the next forward movement of the cap slide which accompanies the draw bars and blank to the winding mechanism.

I claim:—

1. In a safety pin machine, means for necking a safety pin blank and applying a cap thereto, means exerting an endwise pressure on said capped blank for sharpening the uncapped end thereof, means for rotating said pin blank during the sharpening operation, and an abutment plate against which the cap revolves to take up the endwise pressure of said sharpening means.

2. In a safety pin machine, means for necking a safety pin blank and applying a cap thereto, means exerting an endwise pressure on said capped blank for sharpening the uncapped end thereof, means for rotating said pin blank during the sharpening operation, and an abutment plate against which the cap revolves to take up the endwise pressure of said sharpening means, said blank rotating means including a pressure arch and a conveyer which presses the shank of said pin blank against the pressure arch to rotate said pin blank as it is passed through said sharpening means.

3. In a safety pin machine, blank cutting means, means for necking a blank, means for applying a cap to said blank, a pressure arch adapted to frictionally engage the shank of said capped blank, means for conveying said capped blanks breadthwise over said pressure arch, said conveying means being adapted to permit the capped blank to be rotated by the frictional pressure of said pressure arch, means reciprocable lengthwise of said pin blank for sharpening the uncapped end thereof, and an abutment plate against which said cap revolves for taking up the end thrust of said sharpening means.

4. In a safety pin machine, blank cutting means, means for necking a blank, means for applying a cap to said blank, a pressure arch adapted to frictionally engage the shank of said capped blank, means for conveying said capped blanks breadthwise over said pressure arch, said conveying means being adapted to permit the capped blank to be rotated by the frictional pressure of said pressure arch, means reciprocable lengthwise of said pin blank for sharpening the uncapped end thereof, an abutment plate against which said cap revolves for taking up the end thrust of said sharpening means, and a blank winding device, said cap-applying means and blank winding device being arranged adjacent opposite ends of said pressure arch.

5. In a safety pin machine, the combination with necking, capping and sharpening means, of blank-winding means, means for conveying a capped blank from said sharpening means while arranging it to present the cap in a predetermined direction, and means for positively gripping and conveying said blank or safety pin away from said winding means.

6. In a safety pin machine, the combination with a fixed anvil or necking die, to which a blank or strand is fed, a movable die coöperating with said anvil or die to neck said strand or blank, means for feeding the necked blank away from said anvil, and means for lifting said blank over said anvil.

7. In a safety pin machine, the combination with a fixed anvil or necking die, to which a blank or strand is fed, a movable die coöperating with said anvil or die to neck said strand or blank, means for feeding the necked blank away from said anvil, and means for lifting said blank over said anvil, said blank lifting means being operated by said means for feeding the blanks away from said anvil.

8. In a safety pin machine a fixed necking die, a movable necking die, means for feeding the necked blank away from said fixed necking die, and means operated by said feeding means for lifting said blank over said fixed necking die.

9. In a safety pin machine, a fixed necking die, a movable necking die, a pusher finger for moving a necked blank from said fixed necking die, and a lifting finger under the control of said pusher finger for lifting the blank over said fixed necking die.

10. In a safety pin machine, a fixed necking die, a movable necking die, means for feeding a necked blank away from said fixed necking die, and means to lift said blank above said fixed die, said feeding means being adapted to hold said lifting means inoperative during a portion of the travel thereof and to release said lifting means during another portion of the travel thereof.

11. In a safety pin machine, necking means, means for sharpening a blank, a conveyer for passing a blank through said sharpening means, means for feeding a blank from said necking means to said conveyer, said feeding means being adapted to pause in its movement from necking means to said conveyer, and means for applying a cap to said blank during such pause.

12. In a safety pin machine, the combination with sharpening mechanism, of winding mechanism including a winding head rotatable on a fixed axis, means for conveying a blank from said sharpening mechanism to said winding head, and means for removing the finished safety pin from said winding mechanism.

13. In a safety pin machine, the combination with necking, capping, sharpening, and winding mechanisms, means for conveying blanks to said mechanisms successively, a slide movable toward and away from said winding mechanism, said slide being provided with means for guiding the caps as the blanks approach said winding mechanism, a picker movable toward and away from said winding mechanism for removing completed pins, and means for operatably connecting said slide to said picker to alternate the movements of said slide and picker with respect to said winding mechanism.

14. In a safety pin machine, means for necking a blank, push fingers for moving said blank from said necking means, a cam movement operatably connected to said fingers, said cam movement being adapted to impart its movement in two stages with an interval of rest therebetween, means for rigidly clamping a blank during the period of rest, and means for capping said blank during such interval of rest.

15. In a safety pin machine, means for necking a blank, push fingers for moving said blank from said necking means, a cam movement operatably connected to said fingers, said cam movement being adapted to impart its movement in two stages with an interval of rest therebetween, means for rigidly clamping a blank during the period of rest, and means for capping said blank during such interval of rest, said clamping means including a movable clamping jaw, and a cam movement having two stages of movement for respectively moving said clamping jaw close to the blank prior to the capping operation and positively holding said blank during the capping operation.

16. In a safety pin machine, blank cutting means, means for necking a blank, means for applying a cap to said blank, a pressure arch adapted to frictionally engage the shank of said capped blank, means for conveying said capped blanks breadthwise over said pressure arch, said conveying means being adapted to permit the capped blank to be rotated by the frictional pressure of said pressure arch, means reciprocable lengthwise of said pin blank for sharpening the uncapped end thereof, an abutment plate against which said cap revolves for taking up the end thrust of said sharpening means, a blank winding device, said cap-applying means and blank winding device being arranged adjacent opposite ends of said pressure arch, and means for receiving pin blanks from said conveying means and presenting them to said winding device with their caps in the same predetermined order.

17. In a safety pin machine, the combination with a sharpening mechanism adapted to revolve safety pin blanks with caps already applied, of means for arranging said blanks with the caps presented in a predetermined direction, winding mechanism, means for conveying a blank from said sharpening mechanism to said winding mechanism, a slide movable toward and away from said winding mechanism, said slide being provided with means for retaining the caps of said blanks in predetermined direction during their movement, and a picker movable toward and away from said winding mechanism to positively engage and remove the completed pins, and means operatably connecting said slide to said picker to alternate the movements of said slide and picker with respect to said winding mechanism.

WILLIAM A. COURTLAND.